US012089298B2

(12) United States Patent
Asafi et al.

(10) Patent No.: US 12,089,298 B2
(45) Date of Patent: Sep. 10, 2024

(54) HEAT GENERATING ELEMENT AND METHOD FOR MANUFACTURING THE SAME

(71) Applicant: Eberspächer catem GmbH & Co. KG, Herxheim (DE)

(72) Inventors: Ahmad Asafi, Karlsruhe (DE); Stefan Plewnia, Karlsruhe (DE); Kai-Fabian Bürkle, Hinterweidenthal (DE); Rüdiger Freitag, Landau (DE); Michael Niederer, Kapellen-Drusweiler (DE); Müge Pilavtepe-Christ, Karlsruhe (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 931 days.

(21) Appl. No.: 17/132,692

(22) Filed: Dec. 23, 2020

(65) Prior Publication Data

US 2021/0204365 A1 Jul. 1, 2021

(30) Foreign Application Priority Data

Dec. 27, 2019 (DE) ..................... 10 2019 220 589.5

(51) Int. Cl.
*H05B 3/06* (2006.01)
*B60H 1/22* (2006.01)
(Continued)

(52) U.S. Cl.
CPC ............. *H05B 3/16* (2013.01); *B60H 1/2215* (2013.01); *H05B 3/03* (2013.01); *H05B 3/06* (2013.01);
(Continued)

(58) Field of Classification Search
None
See application file for complete search history.

(56) References Cited

U.S. PATENT DOCUMENTS

| 2020/0404748 A1* | 12/2020 | Walz ..................... H05B 3/286 |
| 2021/0033303 A1* | 2/2021 | Kachelhoffer ........ F24H 3/0476 |
| 2021/0274601 A1* | 9/2021 | Kümpel .................. H05B 3/50 |

FOREIGN PATENT DOCUMENTS

| CN | 103313443 A | 9/2013 |
| CN | 108882393 A | 11/2018 |

(Continued)

OTHER PUBLICATIONS

CN-110012564-A, Jul. 2019, Walz, partial translation (Year: 2019).*

*Primary Examiner* — Joseph M. Pelham
(74) *Attorney, Agent, or Firm* — Boyle Fredrickson S.C.

(57) ABSTRACT

A heat-generating element of an electric heating device includes a PTC element, conductor tracks abutting surfaces of the PTC element, and an adhesive which connects the conductor tracks to the PTC element. The conductor track has several contact projections which protrude from an abutment surface of the conductor tracks. The contact projections form a contact surface which abuts the surface in an electrically conductive manner with a free space between the surface and the abutment surface, in which the adhesive is accommodated. Also disclosed is a method in which the contact projections are formed from initially planar conductor track, an adhesive is applied to the abutment surface between the contact projections, a masking covering the contact surfaces is removed, and the conductor track is glued to a PTC element with the adhesive accommodated between the surface and the abutment surface.

14 Claims, 3 Drawing Sheets

(51) Int. Cl.
*H05B 3/03* (2006.01)
*H05B 3/16* (2006.01)
*H05B 3/30* (2006.01)

(52) U.S. Cl.
CPC ............... *B60H 2001/2278* (2013.01); *H05B 2203/016* (2013.01); *H05B 2203/017* (2013.01); *H05B 2203/02* (2013.01); *H05B 2203/023* (2013.01)

(56) References Cited

FOREIGN PATENT DOCUMENTS

| | | | | |
|---|---|---|---|---|
| CN | 110012564 A | * | 7/2019 | ........... F24H 3/0441 |
| DE | 10 2016 224 296 | | 6/2018 | |
| EP | 1872986 | | 1/2008 | |
| EP | 1768457 | | 5/2008 | |
| EP | 2637475 A1 | * | 9/2013 | ............... H05B 3/06 |
| EP | 3101998 | | 12/2016 | |

* cited by examiner

HEAT GENERATING ELEMENT AND METHOD FOR MANUFACTURING THE SAME

BACKGROUND OF THE INVENTION

1. Field of the Invention

The present invention relates to a heat-generating element of an electric heating device. The present invention relates in particular to a heat-generating element of an electric heating device for a motor vehicle. The invention also relates to a method for manufacturing such a heat-generating element.

2. Background of the Invention

The electric heating device for a motor vehicle, into which the heat-generating element according to the invention can be installed, may correspond to a heating device according to EP 1 872 986 A1. With this state of the art technology, a heat-generating element with at least one PTC element, conductor tracks in the form of contact sheets abutting in an electrically conductive manner on contact surfaces of the PTC element, and insulating layers applied against the conductor tracks on the outside is inserted into a pocket which protrude into a circulation chamber as a heating fin. The electric heating device is intended to heat a liquid medium, especially water. From EP 1 768 457 A1, an electric heating device for a motor vehicle is known, in which at least one PTC element is provided between contact plates abutting thereon on both sides in an electrically conductive manner, which form the conductor tracks in the meaning of the present invention. Insulating layers are provided on the outside of the conductor tracks. Corrugated fin layers are applied against these insulating layers, which are accommodated in a housing made of plastic, which forms inlet and outlet openings for the passage of air to be heated. Such an electric heating device may also be an electric heating device in which the heat-generating element of the present invention is used.

In the aforementioned documents from the state of the art, the conductor track is applied against the PTC element in an electrically contacting manner by an externally acting clamping force. Thus, the power current required to heat the PTC element can be introduced into the PTC element with low contact resistance. For this purpose, the PTC element usually has a metallization on its surface which is connected to the surface of the conductor track in an electrically conductive manner. In this state of the art, the abutment surface of the conductor track directly abuts a contacting surface formed by the PTC element.

PTC elements are semiconductor components made of ceramic. The surface of PTC elements is usually rough. Thus, as a rule, contacting is actually made via a plurality of abutment surfaces which are formed by the roughness tips of the metallization of the PTC element and which abut in an electrically conductive manner a abutment surface of the conductor track, which in a macroscopic view is arranged parallel to the surface of the PTC element.

In some cases, the conductor tracks are additionally or alternatively connected to the PTC element by means of an adhesive. EP 3 101 998 A1, for example, describes an adhesive bead placed circumferentially around the end surfaces of the PTC element, which connects the PTC element with the conductor track and also serves to increase the clearance and creepage distance between the conductor tracks of different polarity. Because in the heat-generating element according to the invention, the conductor tracks are energized with different polarity and, in particular in high-voltage applications, it must be ensured that clearance and creepage distances between the polarities are formed such that the power current introduced into the heat-generating element only flows through the PTC element and not past it, and heats it. This requirement is not trivial, since heat-generating elements in motor vehicles are relatively compact.

There are also solutions in which an adhesive is applied evenly to the abutment surface of the conductor track facing the PTC element. This adhesive is typically an electrically conductive adhesive which provides the electrical contact between the conductor track and the surface of the PTC element. Solutions with electrically non-conductive adhesives are also known, in which it is assumed that the conductor track is pressed against the surface of the PTC element such that the roughness tips of the PTC element penetrate the adhesive layer and make electrical contact with the abutment surface of the conductor track.

In addition to good mechanical coupling between the conductor track and the PTC element, good heat extraction must be ensured when manufacturing heat-generating elements with conductor tracks attached to the PTC element. The conductor track usually abuts a main side surface of the PTC element. This main side surface is the largest side surface of the PTC element, which is usually cuboid in shape. The other surfaces which usually connect these main side surfaces in a rectangular extension to the main side surfaces are referred to as end side surfaces in the following. They have a significantly smaller width than the main side surfaces. The width of the end sides is usually at least a factor of 3 smaller than the width of the main side surfaces. The width of the end side surfaces determines the height of the PTC element. In any case, the conductor tracks usually abut the main side surfaces of the PTC element so that the heat has to be extracted through the adhesive layer between the conductor track and the PTC element and through the conductor track. These specifications also apply to a preferred configuration of the PTC element of the heat-generating element according to the invention.

SUMMARY

The present invention intends to indicate a heat-generating element which meets the above requirements for a good mechanical connection between the conductor tracks and the PTC element on the one hand and a good heat extraction from the PTC element on the other hand.

In order to solve this problem, the present invention suggests a heat-generating element having at least one PTC element and conductor tracks abutting usually opposite surfaces of the PTC element. These conductor tracks are connected to the PTC element by an adhesive. The conductor tracks have contact projections protruding from a abutment surface. These contact projections each form contact surfaces which abut the surface of the PTC element in an electrically conductive manner. The contact projections protrude beyond a regularly planar surface of the conductor tracks, which is referred to in the following as the abutment surface and which extends parallel to the surface of the PTC element, which is usually cuboid in shape. Thus, the contact projections provide a free space between the surface of the PTC element and the surface of the conductor tracks, in which the adhesive is accommodated.

Due to the configuration of the contact projections, the free space can be formed with a defined shape. This free space contains the adhesive. Usually, the free space is completely or at least almost completely filled with the adhesive so that the adhesive is provided in the entire heat conduction path. It is assumed that the conductor track is provided with at least the same size as the surface of the PTC element and covers it completely. Of course, the conductor track can also protrude beyond the PTC element. In any case, the adhesive is usually located in the overlapping area of the PCB and PTC element in the entire free space. This avoids cavities or air spaces that can impair the heat dissipation from the PTC element to the outside.

With the height of the contact projections, the thickness of the adhesive film between the abutment surface and the surface can be adjusted. The conductor track is usually a planar product, which forms an at least substantially continuous abutment surface opposite the surface. During manufacture of the heat-generating element, an excess of adhesive can be applied between the conductor track and the PTC element. By pressing usually both conductor tracks simultaneously against the PTC element, excess adhesive can be pressed out that far out of the gap between the PTC element and the conductor track until the contact projections with their contact surface abut the surface of the PTC element. It is understood that this surface is usually formed by the metallization on the PTC element.

According to a possible further development of the present invention, the conductor track is formed by a contact sheet on which the contact projections are usually formed in one piece by a punching process. The contact sheet forms a normally closed abutment surface. The contact sheet can be made of aluminum or copper. All sheets with good thermal and electrical conductivity are suitable for forming the contact sheet. The contact sheet can have a coating of an electrically high-quality material such as silver or tin-silver. The contact projections protruding from the abutment surface are formed by the punching process. In order to produce the contact sheet economically, the contact projections can be formed in a continuous forming process of an initially endlessly fed sheet strip with a uniform grid on the abutment surface. It is important that the contact projections are distributed as evenly as possible over the entire surface of the PTC element. Between the individual contact surfaces, the power current introduced via the conductor track is usually first distributed near the surface via the metallization of the PTC element. Only then does the power current penetrate the ceramic core of the PTC element, which heats up as a result.

The contact sheet may form a terminal lug in one piece. This terminal lug is also usually formed by punching the contact sheet. The terminal lug can be formed offset to the abutment surface by bending, however, it can extend parallel to it, for example.

With regard to a good heat extraction, it has proven to be advantageous to have the contact projections protruding with a height above the abutment surface of not more than 130 µm, typically not more than 100 µm, and more typically not more than 80 µm. The adhesive layer between the abutment surface and the surface is then formed with the appropriate thickness. This thickness is a medium thickness, since it is assumed that also in the context of the present invention, the PTC element has a rough surface.

According to a possible further development of the present invention, the contact projection comprises several protrusion segments separated by slits. These protrusion segments, with their ends abutting the surface of the PTC element, form in sum the abutment surface of the corresponding contact projection. The ends of the protrusion segments can be tapered or sharp-edged, resulting in a very punctual introduction of the current into the surface of the PTC element. The protrusion segments usually have a certain amount of flexibility so that when the conductor track is pressed against the PTC element during manufacture, they can adapt to the unevenness caused by the roughness of the PTC element.

The contact projections can be formed by bending as essentially rigid elevations on a contact sheet. In this case the height of the contact projections determines the distance between the surface and the abutment surface. The conductor track may be a continuous sheet that has no perforations. Alternatively, the contact projections can be formed as spring-elastic elements, which can be formed in one piece by punching and bending from a sheet metal forming the conductor track and which are elastically movable within limits so that when the conductor tracks are pressed against the PTC element, the volume of adhesive provided in between and its displacement determine the thickness of the adhesive layer between the PTC element and the conductor tracks. Such a conductor track may be designed as a continuous sheet metal strip which, apart from possible refractions in the area of the contact projections, completely delimits the slit filled with the adhesive on the side opposite the PTC element.

Practical tests have shown that the sum of the contact surfaces formed by the contact projections should amount to between 2% and 98% of the abutment surface. This requirement results in good electrical contact between the conductor track and the PTC element with good adhesion via the adhesive and good heat extraction from the PTC element.

The adhesive can be any heat-resistant adhesive. The adhesive is especially a silicone adhesive. It can be provided with good heat conducting and/or electrically conducting particles. The maximum grain size of these particles should not exceed 90 µm, and more typically 70 µm. The adhesive may be an electrically non-conductive adhesive. The electrical contact may be made exclusively via the contact surface of the contact projections. Thus, the adhesive has an adhesion-promoting and heat-conducting function. For the best possible heat transfer to the outside of the heat-generating element by the adhesive, the filler content of the good heat-conducting particles should preferably be selected at more than 90% by. It has been found that even a residual proportion of 3% by weight of adhesive, residual particles, is sufficient to permanently connect the conductor tracks to the PTC element. The particles with good heat conductivity may have a heat conductivity of at least 35 W/(m K).

The contact projection may form a contact surface of no more than 3 mm$^2$, and more typically no more than 1.5 mm$^2$.

The above-discussed further developments of the contact projection preferably apply to all contact projections of the conductor track. Accordingly, the conductor track may have has identically formed contact projections over its entire abutment surface, possibly in a predetermined grid.

With regard to high-voltage applications and/or the installation of the heat-generating element according to the invention in a metallic housing, which provides heat extraction surfaces of, for example, heating rods which are circulated by the fluid to be heated, an insulating layer is provided at least on the outside of one of the conductor tracks. This insulating layer usually covers the conductor track completely. Both conductor tracks may be provided with an appropriate insulating layer on their outside. The insulating layer can be formed by a ceramic plate, for example an aluminum oxide plate. The insulating layer can also have a multi-layer structure, for example a combination of a plastic foil and a ceramic plate, as is known from EP 1 768 457 A1, for example. In this case, the several layers of the insulating layer are regularly joined into a unit by calendering or other joining techniques.

The insulating layer may be glued to the conductor track. Here as well, a thin adhesive layer should be used to ensure good heat extraction. In particular, when forming the contact projections from a sheet material, recesses occur on the outer surface of the conductor track opposite the PTC element, into which the adhesive can be displaced when the insulating layer is pressed against the outer surface of the conductor track. This facilitates the formation of a very thin adhesive film between the outer surface and the associated abutment surface of the insulating layer.

In the method according to the invention for manufacturing a heat-generating element, at least one conductor track with an initially planar abutment surface, usually a continuous sheet metal strip, is first processed to form the contact projections. Then an adhesive is applied to the abutment surface and between the contact projections without covering or wetting abutment surfaces formed by the contact projections with the adhesive. Thereafter, the conductor track is glued to a PTC element such that the contact projections are electrically conductively applied to the surface of the PTC element and the adhesive is absorbed between the surface and the abutment surface.

The adhesive may be applied by screen printing. The stencil used in screen printing, to which the adhesive is applied in this case, which is pressed through the stencil with a squeegee, serves to mask the contact surfaces. The stencil covers the contact surfaces accordingly so that adhesive is pressed through the stencil laterally past the contact surfaces and between the contact projections and applied to the conductor tracks between the contact projections.

In the same screen printing device, the outside of the conductor tracks is usually also provided with adhesive after turning them over, in order to glue a possible insulating layer to the outside of the conductor tracks. The insulating layer is usually glued to the conductor track after the conductor tracks have been glued to the PTC element.

BRIEF DESCRIPTION OF THE DRAWINGS

Further details and advantages of the present invention result from the following description of embodiments in connection with the drawing. Therein.

DETAILED DESCRIPTION

Figure 1:
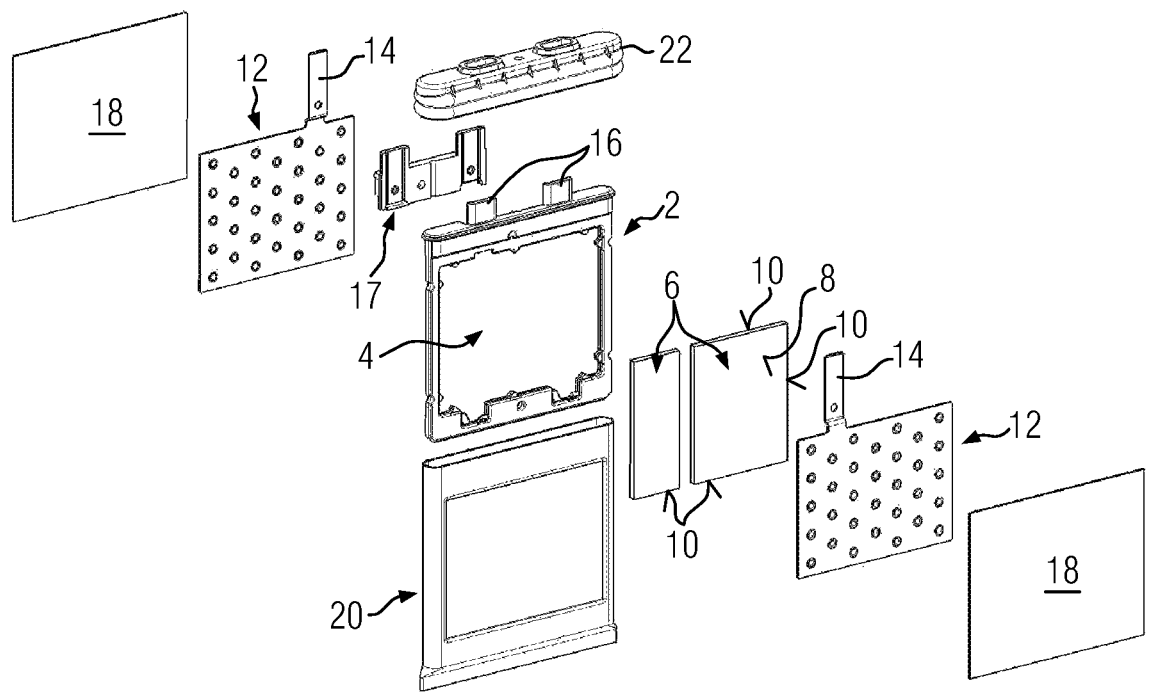
FIG. 1 shows a perspective exploded view of an embodiment of a heat-generating element.

The embodiment according to FIG. 1 shows a housing 2 made of plastic, which is configured as a frame and forms an accommodation space 4 to accommodate PTC elements 6. The two PTC elements 6 are each cuboid in shape and have opposing surfaces 8, which are connected to the main side surfaces of the PTC elements 6 that predominantly emit the heat, and to each other by circumferential end surfaces 10. Opposite the surface 8, conductor tracks in the form of contact plates 12 are shown, each of which has a terminal lug 14 formed by punching and bending the sheet material. Corresponding to these terminal lugs 14, the housing is provided with 2 connecting pieces 16 which accommodate the respective terminal lugs 14 so that the free end of the terminal lugs 14 protrudes beyond the housing 2. These free ends of the terminal lugs 14 are used to energize the PTC elements 6 within the housing 2. After the terminal lugs 14 have been inserted, the connecting pieces 16 are covered with a lid 17, which is attached to the housing by hot caulking of pins that protrude from the housing 2 and each pass through a bore in the lid.

Reference sign 18 shows insulating layers in the form of aluminum oxide plates whose base area is larger than the base area of the contact plates 12 (without the terminal lugs 14) and which at least partially cover the frame-shaped housing 2 in the assembled state.

The above-discussed unit is first prefabricated and then inserted into a metal housing 20 made of a sheet metal material, over which a sealing collar 22 made of a soft elastic plastic is drawn at the end in order to insert the heat-generating element identified by reference sign 24 into a receiving pocket of a partition wall, as described in DE 10 2016 224 296 A1, for example.

The heat-generating element according to the invention in connection with such a heating device or the examples of electric heating devices discussed in the introductory part of the description can also realize the invention. Accordingly, the present invention is also embodied in an electric heating device, in particular in a motor vehicle with at least one of the heat-generating elements according to the invention.

Figure 3:
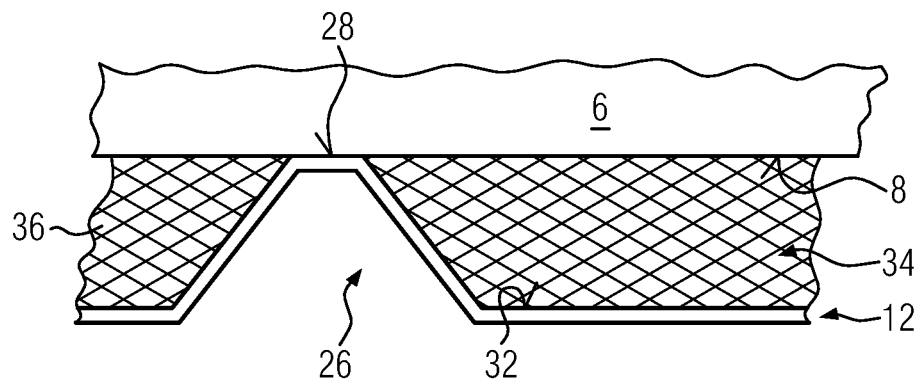
FIG. 3 shows a cross-sectional view of the embodiment according to FIGS. 1 and 2 after assembly.
Figure 2:
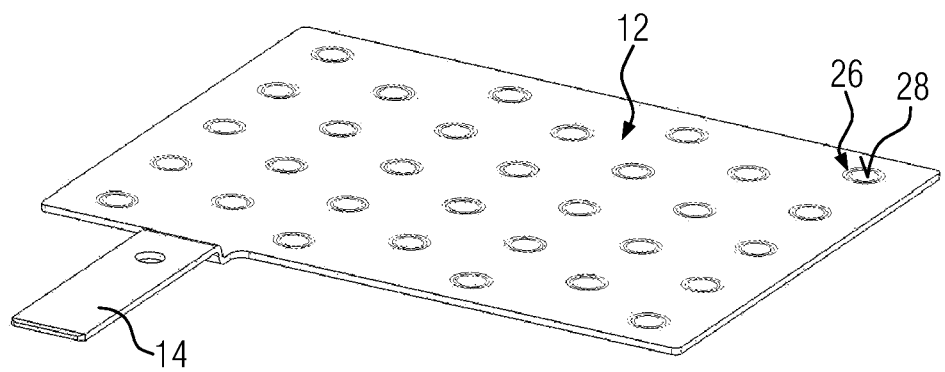
FIG. 2 shows a perspective top view of the embodiment of the conductor track according to FIG. 1.

FIGS. 2 and 3 illustrate details of the contact plate 12. The contact plate 12 apparently has a plurality of contact projections 26 pressed out of the plane of the sheet material by punching and bending, which are presently formed in the shape of a truncated cone and form a contact surface 28 with a size of about 3 mm at their free end. The contact projections 26 are arranged in parallel rows with basically the same transverse and longitudinal distance between them, resulting in uniform contouring between the contact surfaces 28 of the surface 8 of the PTC element 6 (cf. FIG. 3).

The free space 34 pressed free by the contact projections 26 between an abutment surface identified by reference sign 32 and protruded by the contact projections 26 and the opposite surface 8 of the PTC element 6 has a thickness corresponding to the height of the contact projections 26. The free space 34 presently has a thickness of 80 mm This free space 34 is filled by an adhesive 36, which is an electrically non-conductive adhesive, e.g., silicone.

Accordingly, the current input via the contact sheets 12 into the PTC element 6 is made solely via the contact surfaces 28 of the respective contact projections 26. The heat extraction is made from the surface 30 of the PTC element 6 both through the sheet material of the contact projections 26 and through the free space 34 filled with adhesive 36.

The configuration shown offers the advantage of a reliable and uniform electrical contact between the conductor track 12 and the surface 8 of the PTC element 6. In addition, the free space 34 is predefined with a clearly defined thickness so that the thermal resistance of the heat-generating element can be precisely precalculated and is low.

Figure 4:
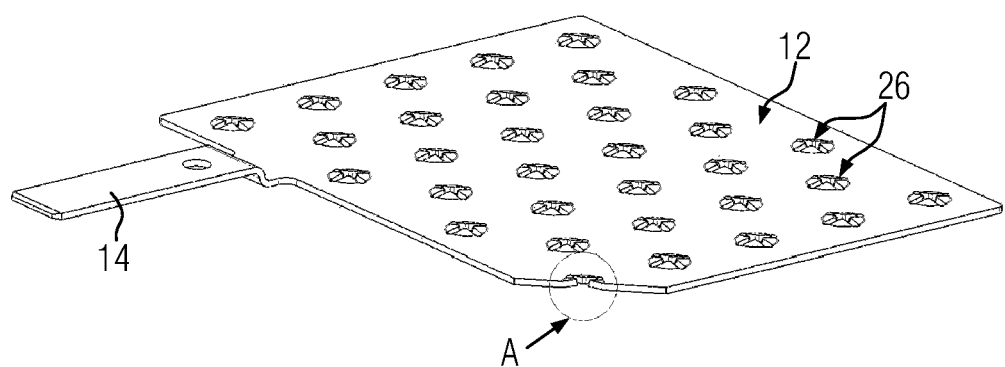
FIG. 4 shows a perspective top view as shown in FIG. 2 for another embodiment of a conductor track, wherein one corner has been removed for the representation according to FIG. 6.
Figure 5:
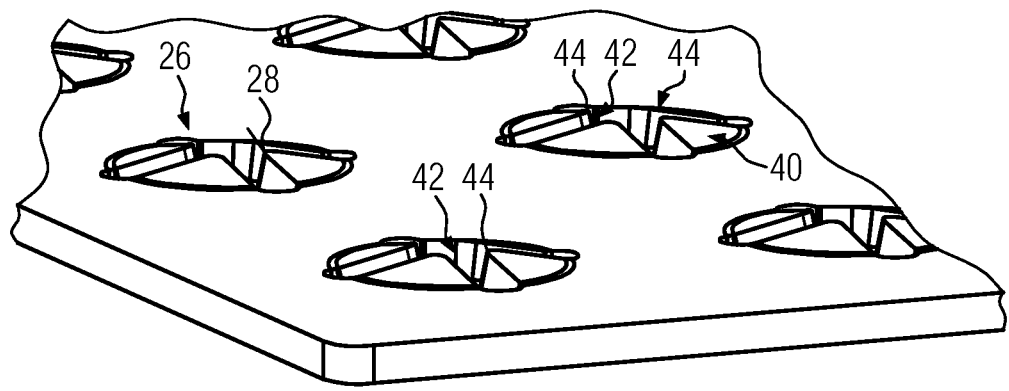
FIG. 5 shows a representation according to FIG. 4 for an enlarged detail of this Figure, and FIG. 6 a perspective sectional view of detail A according to FIG. 4.
Figure 6:
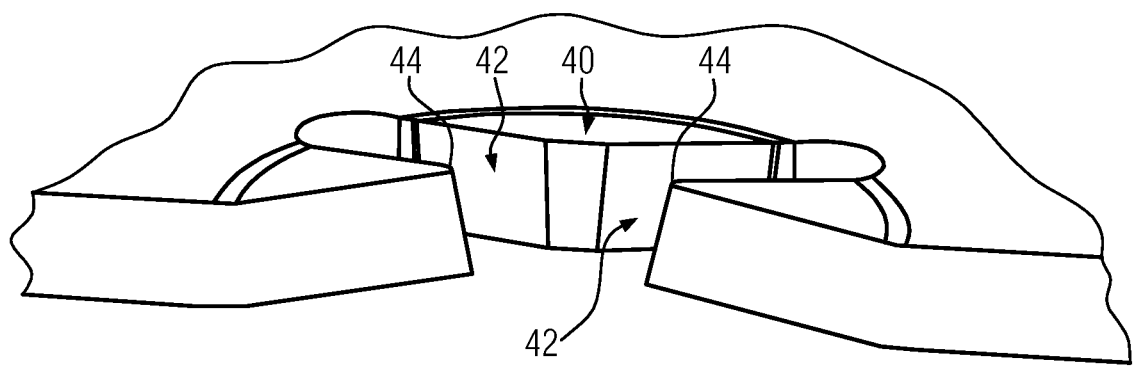

FIGS. 4 to 6 show an alternative embodiment of a conductor track in the form of a contact sheet 12. Each contact projection 26 has four protrusion segments 40, which are separated from each other by radial slits 42 and which are bent out of the sheet material. This results in tapered contact tips 44, which are connected in an electrically conductive manner to the surface 30 of the PTC element 6. The protrusion segments 40 are elastically bent out of the plane of the sheet metal so that when the contact sheet 12 is pressed against the PTC element 6, individual protrusion segments 40 can avoid any roughness peaks of the PTC element 6. Accordingly, all protrusion segments 40 of a contact projection 26 abut the surface of the PTC element 6 in an electrically conductive manner.

The invention claimed is:

1. A heat-generating element comprising:
a PTC element;
conductor tracks abutting surfaces of the PTC element; and
an adhesive which connects the conductor tracks to the PTC element, wherein
the conductor tracks each have an abutment surface extending parallel to the associated surface of the PTC element, wherein
a plurality of contact projections, formed by the conductor tracks, protrude from the abutment surface of each of the conductor tracks, wherein
each of the projections forms a contact surface which abuts the associated surface of the PTC element in an electrically conductive manner and forms a free space between the associated surface of the PTC element and the abutment surface of the conductor track, and wherein
the adhesive is accommodated in the free space.

2. The heat-generating element according to claim 1, wherein the free space is filled with the adhesive.

3. The heat-generating element according to claim 1, wherein the contact projections of each conductor track are formed in one piece on the conductor track.

4. The heat-generating element according to claim 3, wherein each conductor track and the associated contact projection are formed in one piece by a contact plate.

5. The heat-generating element according to claim 3, wherein each conductor track has a terminal lug formed in one piece thereon.

6. The heat-generating element according to claim 1, wherein the contact projections of each conductor track protrude from the abutment surface of the conductor track with a height of no more than 130 μm.

7. The heat-generating element according to claim 1, wherein each contact projection has a plurality of protrusion segments separated by slits.

8. The heat-generating element according to claim 1, wherein a sum of the contact surfaces formed by the contact projections constitutes between 2% and 98% of the associated abutment surface.

9. The heat-generating element according to claim 1, wherein each contact projection forms a contact surface of not more than 3 $mm^2$.

10. The heat-generating element according to claim 1, wherein an insulating layer is provided on an outside of the conductor tracks opposite the PTC element.

11. The heat-generating element according to claim 10, wherein the insulating layer is glued to the conductor tracks.

12. The heat-generating element according to claim 6, wherein each contact projection has a plurality of protrusion segments separated by slits.

13. A method for manufacturing a heat-generating element of an electric heating device, comprising:
processing at least one conductor track having an initially planar abutment surface to form contact projections protruding from the abutment surface;
applying an adhesive to the abutment surface between the contact projections, without the contact surfaces that are formed by the contact projections being covered with the adhesive; and
gluing the conductor track to a PTC element so that the contact projections abut the surface of the PTC element in an electrically conductive manner and the adhesive is accommodated between the surface of the PTC element and the abutment surface of the conductor track.

14. The method for manufacturing according to claim 13, wherein the adhesive is applied by screen printing, and wherein a stencil that is penetrated by the adhesive during printing masks the contact surfaces that are formed by the projections.

* * * * *